United States Patent
Pongratz et al.

(10) Patent No.: US 8,958,648 B2
(45) Date of Patent: Feb. 17, 2015

(54) METHOD FOR RECOGNITION OF A PREDETERMINED PATTERN IN AN IMAGE DATA SET

(71) Applicant: EADS Deutschland GmbH, Ottobrunn (DE)

(72) Inventors: Hans Wolfgang Pongratz, Taufkirchen (DE); Manfred Hiebl, Neuburg a.d. Donau (DE)

(73) Assignee: EADS Deutschland GmbH, Ottobrunn (DE)

( * ) Notice: Subject to any disclaimer, the term of this patent is extended or adjusted under 35 U.S.C. 154(b) by 185 days.

(21) Appl. No.: 13/759,536

(22) Filed: Feb. 5, 2013

(65) Prior Publication Data

US 2013/0202211 A1 Aug. 8, 2013

(30) Foreign Application Priority Data

Feb. 6, 2012 (DE) .......................... 10 2012 002 321

(51) Int. Cl.
*G06K 9/00* (2006.01)
*G06K 9/46* (2006.01)
*G06K 9/62* (2006.01)

(52) U.S. Cl.
CPC ................ *G06K 9/4604* (2013.01); *G06K 9/00* (2013.01); *G06K 9/0063* (2013.01); *G06K 9/6212* (2013.01); *G06K 2009/00644* (2013.01)
USPC ........... 382/199; 382/224; 382/225; 382/226; 382/227; 382/260; 382/261; 382/262; 382/263; 382/264; 382/232; 382/280

(58) Field of Classification Search
CPC . G06K 9/6255; G06K 9/0063; G06K 9/6202; G06K 2009/00644; G06K 9/4604; G06K 9/6212; G06K 9/6292; G06T 7/004; G06T 2207/30108; G06T 7/2033; H01L 2224/48471; G11B 5/5552; G11B 20/1208; G11B 27/3027; A61B 5/048; A61B 6/12; G01N 21/95; G03G 15/5062; G09G 5/02; G01B 11/028; G05B 2219/36484; G05B 19/40935; H04N 2201/04734; H04N 2201/0426; H04N 5/9205; H04N 5/945; G03B 15/003; G03B 27/725; Y10S 359/90; G01S 17/50; G01V 11/00; G06F 17/15; G06F 11/3688; G10L 25/12; H04L 12/2697; H04L 43/50
USPC ......... 382/199, 224–227, 260–264, 156, 201, 382/232, 280
See application file for complete search history.

(56) References Cited

U.S. PATENT DOCUMENTS 4,677,564 A * 6/1987 Paly et al. ..................... 700/134
5,419,163 A * 5/1995 Kim et al. .................... 68/12.02

(Continued)

FOREIGN PATENT DOCUMENTS

| DE | 199 55 919 C1 | 5/2001 |
| DE | 10 2005 009 626 A1 | 8/2006 |
| DE | 10 2006 060 612 A1 | 6/2008 |

*Primary Examiner* — Vu Le
*Assistant Examiner* — Aklilu Woldemariam
(74) *Attorney, Agent, or Firm* — Crowell & Moring LLP

(57) ABSTRACT

A method for recognition of a predetermined pattern in an image data set recorded by a device for recording of at least two electromagnetic frequency spectra is provided. A first difference value is formed for the image points of the selected area as a function of a difference between a data vector of a corresponding image point and a first reference data vector. A second difference value is formed for an image point of a selected area as a function of a difference between the data vector of this image point and a second reference data vector. A predetermined pattern is recognized when it is determined at least one pattern correlation quantity is below a predetermined threshold value and a local minimum is present.

20 Claims, 2 Drawing Sheets

(56) References Cited

U.S. PATENT DOCUMENTS

| | | | |
|---|---|---|---|
| 5,666,341 A * | 9/1997 | Horibe et al. | 369/47.28 |
| 5,790,690 A * | 8/1998 | Doi et al. | 382/128 |
| 6,944,342 B1 | 9/2005 | Stahl et al. | |
| 7,250,966 B1 * | 7/2007 | Engelsberg | 348/208.3 |
| 8,655,084 B2 * | 2/2014 | Bebis et al. | 382/224 |
| 2008/0193029 A1 * | 8/2008 | Kamata et al. | 382/249 |
| 2008/0205769 A1 * | 8/2008 | Taguchi et al. | 382/209 |
| 2009/0154812 A1 * | 6/2009 | Schmitt | 382/199 |
| 2010/0008598 A1 * | 1/2010 | Riley et al. | 382/299 |
| 2010/0296701 A1 * | 11/2010 | Hu | 382/103 |
| 2011/0311130 A1 * | 12/2011 | Ichimori | 382/154 |

\* cited by examiner

METHOD FOR RECOGNITION OF A PREDETERMINED PATTERN IN AN IMAGE DATA SET

CROSS-REFERENCE TO RELATED APPLICATIONS

The application claims priority under 35 U.S.C. §119 to German Patent Application No. 10 2012 002 321.9, filed Feb. 6, 2013, the entire disclosure of which is herein expressly incorporated by reference.

TECHNICAL FIELD

The present invention concerns a method for recognition of a predetermined pattern in an image data set.

BACKGROUND OF THE INVENTION

Recognition in an image data set, which was recorded by a multispectral camera or other appropriate sensor mechanism, plays a role in a number of applications. Some such applications are military reconnaissance, surgery, traffic monitoring or terrain monitoring in the civil context, and also speech recognition, text recognition, and facial recognition. The length of time during pattern recognition often also plays an important role in practice and a central problem of pattern recognition is that the recognition of patterns often takes too long.

For example, in the context of military reconnaissance images of terrain to be monitored are recorded by a multispectral camera, whereupon the images are examined to determine whether certain objects, like vehicles, buildings or certain equipment, are present in the terrain. A specific pattern to be recognized within a recorded image data set then corresponds to a search object at the level of image data. An image data set is recorded, for example, during an overflight of the terrain being monitored and it is desirable to quickly recognize which of the search objects are present in the terrain. However, it has been shown that evaluation of recorded image data sets takes longer than desired.

German Patent Document DE 10 2005 009 626 A1 discloses a method and camera for following target objects in which the camera has an image sensor unit to generate image data and a processing unit to process the image data sent by the image sensor unit to the processing unit. The method involves the identification of partial areas of recorded image data sets for which there is an increased probability that they contain a search pattern and to send only the partial areas from the image sensor unit to the processing unit. In this way pattern recognition runs more quickly, but pattern recognition is too slow for many applications, like real time terrain monitoring in the context of military reconnaissance.

German Patent Document DE 10 2006 060 612 A1 discloses a multispectral camera with four spectral channels with which target objects can be recorded, for example, during an overflight of the terrain being monitored and the recorded image data sets are sent to a processing unit generally stationed on the ground. Target objects with low contrast relative to the background can also be recognized on the images recorded with the known multispectral camera, for example, by using RGB images and false color images. The processing of image data sets up to recognition of target objects in this method is very time-intensive.

German Patent Document DE 199 55 919 C1 discloses a method for recognition of patterns in an image data set in which at least one partial area of the image data set is classified as relevant by means of predetermined criteria and classification images are formed from image points in the relevant partial area and specifically by means of predetermined classification rules to determine the affiliation of image areas to a predetermined pattern. The classification images belonging to a certain pattern class are then combined and, using the combined classification images, it is determined whether they correspond to the predetermined pattern, which leads to recognition of the predetermined pattern. This method also has the drawback that recognition of patterns in image data sets takes too long for many applications.

The known methods are not suitable, in particular, to check a large amount of image data sets within a very short time for the presence of a pattern. Real time monitoring of a large area, for example, with a reconnaissance aircraft, with which large numbers of images of the area are continuously recorded, and simultaneously running pattern recognition are therefore not possible by means of known methods.

SUMMARY OF THE INVENTION

Exemplary embodiments of the present invention provide a method for recognition of a predetermined pattern in an image data set, which runs more quickly than known methods and which, in particular permits, more rapid recognition of a predetermined pattern.

In accordance with exemplary embodiments of the present invention, a method is provided for recognition of a predetermined pattern in an image data set recorded by means of a device for recording at least two electromagnetic frequency spectra, which has a number of image point data, the method including the following steps:

Reference data vectors with characteristic reference coefficient values for at least two pattern image points of the predetermined pattern are formed;

For each image point at least of a selected area of the recorded image points a data vector with characteristic coefficient values is formed as component from image point data from at least one test environment of the image point, consisting of image points at a predetermined distance from the corresponding image point;

For the image points of the selected area, as a function of the difference between the data vector of the corresponding image point and the first reference data vector, at least one first difference value is formed;

For at least one image point of the selected area, depending on a difference between the data vector of the image point and the second reference data vector, at least a second difference value is formed;

It is determined whether at least one pattern correlation quantity determined as a function of the first and second difference value falls below a predetermined threshold value and whether this forms a local minimum in an environment of the size of the target object; and The predetermined pattern is recognized if the predetermined threshold value was fallen short of and a local minimum is present.

The test environment can be constructed from rotationally invariant elements of say, 5×5 pixels. The coefficients of this 5×5 element, as will be further explained below, are represented by filtered and weighted color components or brightness values of the average pixel of the 5×5 pixel element. The coefficient values can be determined in advance and entered in a database.

The method for recognition of the predetermined pattern therefore includes at least one processing step and five evaluation steps. The predetermined pattern is coded in the processing step in the form of reference data vectors, namely by forming at least two reference data vectors. The five evaluation steps are conducted in order to recognize an already predetermined and coded pattern in a recorded image data set and include the formation of data vectors for image points of the recorded image data set up for recognition of the predetermined pattern.

A device for recording at least two electromagnetic frequency spectra is used as device for recording the image data set being evaluated, in other words, a device for recording two spectral channels, but preferably it has four to six, if required, however, more spectral channels, for example, also 10 spectral channels. A multispectral camera is suitable as device. This can include a Kodak® KAF-8300 camera to record red light, green light and near infrared and a camera of the type TriWave® CC701 Visible, NIR, SWIR to record middle and/or far infrared. An image data set recorded with the device has a number of image data points, one image point datum with a recorded value per spectral channel of the device being assigned to an image point.

The predetermined pattern can correspond to a specified search object. For performance of the mentioned processing step, formation of the reference data vectors so that a predetermined pattern can be recognized at all, a predetermined object, for example, a tank in the context of military reconnaissance, is recorded with the mentioned device and the reference data vectors are then formed from the recorded pattern image material. The term vector here and subsequently should not be interpreted in the strict mathematical sense, but expresses the fact that different data values are fixed as components in an ordered sequence. If a search object cannot be recorded by means of a device, for example, an inaccessible vehicle, it is also possible to produce a computer model with a computer graphics program and generate the reference data vectors from the computer model. A number of patterns can then also be predetermined and the search for all predetermined patterns can run in parallel. If a pattern is predetermined and coded in the form of reference data vectors, the mentioned preparation step need not be repeated and any image data sets can then be examined for the presence of the pattern.

The two pattern image points of the pattern image for which reference data vectors are formed are preferably chosen so that they contain the most informative information possible. If the pattern image is a photo of a tank, for example, two locations of the tank are selected as pattern image points, which stand out with respect to properties, like color, shape and so forth and contrast strongly with the surroundings so that the corresponding reference data vectors contain the most informative data in the form of characteristic reference coefficient values as components of the reference data vector. For example, for a tank a prominent location on a turret or perhaps an entry hatch would be suitable as pattern image point.

If at least one pattern is predetermined and if an image data set to be evaluated is recorded, a data vector with characteristic coefficient values is chosen for each image at least for a selected area of the image points of the image data set, in which the selected area can also include the entire image data set. The data vector for a specific image point is then formed from the image point data of the image point and also from image point data of image points at a predetermined distance from the image point. Accordingly, information about the adjacent image points are considered in addition to the information about the image point itself. The image point together with the image point surrounding it in an area of, say, 5×5 pixels, which are also considered to form the data vector, is a test environment of the image point. A test environment can consist, for example, of a square of 5×5 image points in whose center the image point whose data vector is formed is situated. However, larger test environments can be formed from several, e.g., nine elements of 25 points each, which are preferably rotationally invariant. The test environment so expanded therefore consists of the center element and eight edge elements arranged around the center element in a square.

For pattern recognition this expanded test environment can be tested in 12 rotational positions as to whether a correlation with the search image exists in one of the rotational positions on the search object contained in it. Twelve rotational positions are then sufficient in the sequence of rotational invariance of the 25 point individual elements in order to be able to cover any arbitrary rotational position with very few errors. The rotational position with the smallest difference value of the feature vectors is entered as best match in a result database at the position of the center pixel and the difference sum recorded. All pixels in the result database, in which a distinct local minimum of the difference value of the feature vectors is present and the difference value lies below a certain bound, are evaluated as a test environment of the search object recognized as a known reference image.

The feature vector of the test environment in the rotational position is formed by the fact that the center points of the 5×5 elements are calculated in the rotational position in the search image. At the coordinates of the transformed center points the rotationally invariant averages entered in the database and standard deviations of normalized color components and the brightness value are taken from the search image and entered in the feature vector of the test environment without recalculation of all average values in the rotated position. This results in a significant saving of calculation expense.

A correlation is sought between the image point and one of the pattern image points for the image points of the selected area. A difference is then formed between the data vector of the image point and the first reference data vector and at least a first difference value formed as a function of the difference. The difference between the data vector and the first reference data vector must be formed component-by-component, which means that a difference is formed between each characteristic coefficient value of the image point and the corresponding characteristic reference coefficient value. The first difference value, for example, is the amount of the difference vector, i.e., its Euclidean norm. As an alternative to this, several first different values correspond to the formed differences of the coefficient values.

In similar fashion to how the first difference value or values were formed, a second difference value is formed for at least one image point of the selected area of the image data set. The at least one second difference value is formed at least for an image point, but if required also for a number of them, for example, all image points of the selected area of the image data set.

Numbering of the image points and data vectors, or the reference data vectors, in other words, the sequence in which the first or second data vector or the first and second reference data vectors are used, then plays no role. Numbering is created only for illustration and does not represent a restriction of the claimed object. The sequence of correlation steps with respect to the first or second data vectors can therefore be arbitrarily varied.

Finally, a pattern correlation quantity is formed from the determined difference values, based on which a decision is made as to whether the predetermined pattern is recognized. The pattern correlation quantity can contain partial elements from all normalized color components and the total brightness and therefore form a multispectral correlation vector on the basis of which a decision is made as to whether the predetermined pattern is recognized. The pattern correlation quantity can be a single value, for example, the sum of the amounts of two difference values, or it can also be a vector quantity with several values, for example, a vector with the absolute amounts of the differences between characteristic coefficient values of the image point and the first reference coefficient values and the second reference coefficient values as component inputs.

Finally, as first necessary condition for pattern recognition, it is checked whether the pattern correlation quantity falls below a threshold value, in which case the threshold value of the type of object is predetermined according to the pattern correlation quantity, which means that the threshold value is a single value or a vector quantity with several inputs. If the threshold value is fallen short of, this means that the two image points have almost the same (or at least very similar) characteristic coefficient values as the pattern image points. If the predetermined pattern is actually present in the image data set and was recognized, the deviation of the determined pattern correlation quantity from an ideal typical value "zero" is considered to be the result of background noise, measurement indistinctness and/or the effect of interfering variables.

As second necessary condition for pattern recognition, the pattern correlation quantity at the location of the object being recognized must have a local minimum of the absolute amount of the difference quantities in all directions.

Since the data set required for pattern recognition is primarily restricted to characteristic coefficient values or reference coefficient values, i.e., data vectors and reference data vectors, and image data sets are processed highly selectively, the method according to the invention runs very quickly and permits very rapid recognition of a predetermined pattern. Recognition occurs particularly more quickly than with the known methods. The method according to the invention is therefore also suitable for use in the military field, for example, for real time monitoring of terrain by means of a flying object for the occurrence of certain objects, like vehicles, buildings or certain equipment.

Since components of data vectors, i.e., the characteristic coefficient values of image points, consider not only information concerning the corresponding image point but also information about the adjacent 24 image points of the 5×5 pixel element, through digital filtering with a coefficient matrix according to the invention, the information content of the characteristic coefficient values is highly compressed so that the method can operate very precisely based on little data. The accuracy of the method according to the invention can be increased in simple fashion, depending on how much calculation power is available for performing the method, or adapted to certain purposes by increasing or reducing the number of pattern image points for test environments of a pattern to be predetermined.

According to a preferred variant of the method according to the invention at least one characteristic coefficient value of the data vector is determined as average value from the visible light in the frequency range recorded for the image points in the first test environment or image point data lying in the infrared range, or as average value of the luminances of the image points of the first test environment.

The first test environment of an image point is then a square of 5×5 image points in whose center the image point is situated. For example, if color values were recorded as image point data with a multispectral camera by means of three or four spectral channels, like red values, green values or infrared values, a luminance, i.e., a brightness value of the image point can also be determined from the color values of an image point. One or more characteristic coefficient values are then determined from the average values of the image point data in the test environment, for example, from the red values of all image points, all green values, all infrared values and/or all luminances of the image points in the first test environment. Some characteristic coefficient values of the data vector of an image point then include an average red value $<R>_1$, an average green value $<G>_1$, an average infrared value $<I>_1$ and an average luminance value $<E>_1$ in which the average values each refer to all values in the first test area.

At least one characteristic coefficient value of a data vector is also preferably determined as a standard deviation of a color or brightness in the 5×5 image point data, which were recorded for image points lying within the first test environment, or as a standard deviation between the luminances of the image points of the first test environment. The test environments are then formed and evaluated precisely as in the feature vectors described above for the weighted color components and brightness values. Instead of intensity values, the standard deviations of the intensity values are now used in the feature vector.

According to the preferred variant, if normalized color values and the overall brightness value are available as image point data, the standard deviations of the color values and the brightness value within the first test environment are determined as a characteristic coefficient value of the feature vector. Several or all characteristic coefficient values can then also be determined as standard deviations. A data vector of an image point can thus include a standard deviation of the red value $\sigma_R$ in the first test environment, a standard deviation of the green value $\sigma_G$, a standard deviation of the infrared value $\sigma_I$ and a standard deviation of the luminance value $\sigma_E$ as characteristic coefficient values.

At least one characteristic coefficient value of the data vector is preferably determined as average value of the color data of the image points of a second test environment or as average value of the luminances of the image points of the second test environment.

The second test environment is equally large, preferably larger than the first test environment. The second test environment is then a square of 15×15 image points and consists of nine rotationally invariant 5×5 pixel elements and the nominal image point is situated in its center. Examples for characteristic coefficient values of a data vector of an image point are then again an average red value $<R>_2$, an average green value $<G>_2$, an average infrared value $<I>_2$ and an average luminance value $<E>_2$, in which the average values, however, now refer to the second and not the first test environment. Average values that refer to the first test environment and average values that refer to the second test environment can then also coexist as characteristic coefficient values.

This test environment must be calculated and tested in the above-stated size at least in 12 rotational positions for which rotational position offers the best agreement with the search image point. The best rotational position is then used as pattern feature vector. A feature vector can also be formed for the second test environment from the standard deviations of the color components and brightness and the separation sharpness of the pattern recognition method thus further improved.

If a second test environment is also determined to belong to a predetermined reference image of the search object after a first test environment, this means, on the one hand, that the predetermined reference image was re-recognized, and, on the other hand, the position of the search object in the image data set as well as the rotational position of the search object are obtained from the relative position of the two test environments. The number of additional test environments can be arbitrarily increased to increase accuracy. The distance that the additional test environments are predetermined to be from the first test environment on the search object in the reference image can be finally measured in the search image in order to record and consider possible scale deviations with respect to distance between the test environments in the search image and in the reference image.

A predetermined reference image then corresponds to the predetermined search object. The method can then be applied to any predetermined imagable search objects. In military applications the predetermined search object can be a specific vehicle, like a tank. A reference image on a known scale is then recorded from the search object with a multispectral camera so that a reference image data set of the object is available. If the search object is not accessible, a reference image data set of the object can also be generated by a computer graphics system, if sufficient information on the color and external profile of the search object is available.

In the search for very complex objects that stand out well from the background, the search can be significantly accelerated by the fact that the search is started in a search image depicted with a strongly coarsened resolution of, say, 6 meters in a 150 meter object, which is selected so that the search object is recorded precisely in a 25×25 pixel test environment.

As soon as a search object is recognized, a second set of test environments is tested against the reference database and recognition of the object refined at a higher resolution of, say, one meter resolution, which, for example, records a ship in six adjacent test environments.

If precise assignment of the found object to the reference database is still not possible, individual objects on the deck of a ship object are used from the reference database with a full resolution of the camera of, say, 0.2 meters, in order to provide more precise clarification of the identity of the considered ship object with reference to the reference database.

Objects, for example, weapons that are discovered on the deck of a ship normally known as legal, can also provide indications that a crime is present here. For precise recognition of weapons and similar hazardous objects images with very high resolution of 2.5 cm can be made with the camera and compared with the reference photos. Photos of this type can be used in court as evidence.

At least one characteristic coefficient value of the data vector is preferably determined as a curvature value of a color surface or luminance surface, i.e., as a difference between the average value of the image point data or luminances of the first test environment and the average value of the image point data or luminances of the second test environment.

A feature vector (data vector) of an image point can include as components a red curvature value $k_R=<R>_1-<R>_2$, a green curvature value $k_G=<G>_1-<G>_2$, an infrared curvature value $k_I=<I>_1-<I>_2$ and a luminance curvature value $k_E=<E>_1-<E>_2$ in addition to the average values of the standard deviation.

According to a preferred variant of the method according to the invention, those image points are chosen as preselection from the recorded image points in which the first difference value falls below a predetermined first threshold value. The image points of the preselection are considered image points potentially belonging to the predetermined pattern.

Depending on the variant, it is then only required as condition that an image point must fulfill in order to be included in the preselection that a single first difference value falls below a threshold value or it can also be predetermined for several difference values that each must fall below an individual threshold value. By preselection further evaluation is restricted to a smaller number of image points so that the method runs more quickly.

According to another variant of the method an increased selection of image points is formed by selecting image points in which one or more difference values are minimal.

A number of image points can be predetermined, for example, 20 items and then those selected among all image points up to the predetermined number at which the difference value or values are minimal. In this way the data set to be further analyzed can be reduced very quickly so the method runs more quickly.

According to an advantageous modification of the invention, the reference data vectors are formed from pattern image point data of a reference test environment, and for the image points of a selected area or the preselection a histogram is prepared as a function of the differences between recorded image point data and the pattern image point data from the reference test environment and a selection of image points is formed as a function of the evaluation of the histogram.

By evaluating a histogram of the differences between the recorded image point data in the first and second test environments and the pattern image point data in the reference test environment it is checked whether the image point data in the test environment are very similar to the pattern image point data. Evaluation of the histogram is therefore more precise than a check of the deviation between characteristic coefficients of the image point and a pattern image point, since the characteristic coefficients can be randomly similar because two very different data sets, for example, have two similar average values. With histogram evaluation a very precise test is therefore carried out as to how strongly an image point and a pattern image point are similar.

Since the method step of histogram evaluation, however, is more demanding with respect to the data set being processed in the preceding steps, it is only carried out for image points that are already part of the preselection and therefore belong to the predetermined pattern with higher probability. The selection of image points is then preferably a stronger limitation on image points potentially belonging to the pattern than the aforementioned preselection. In this way by successive restrictions to increasingly smaller data sets, i.e., from the recorded image data set to a selected partial area, to a preselection and then to a selection, increasingly more demanding and more precise test steps are conducted to determine whether an image point belongs to a predetermined pattern in a simultaneously very quickly running method, since the data sets to be processed in each step are kept small.

According to a preferred variant of the invention, additional image points arranged largely in a circle are chosen for an image point that belongs to the preselection or selection of image points at a predetermined distance to the image point and another image point, whose corresponding second difference value is minimal and falls below a predetermined second threshold value, is defined as the second image point of the pattern.

If a second image point is also determined to belong to a predetermined pattern after a first image point, this means, on the one hand, that the predetermined pattern was recognized and, on the other hand, so was the position of the pattern in the image data set and the rotational position of the pattern from combination of the two image points. Depending on how accurate the method is supposed to be and especially how accurate the rotational position is to be determined, a corresponding number of additional image points can be predetermined for the last named method step. An example would be stipulation of 12 additional image points on a circle enclosing the first image point. In this case the rotational position of the pattern can be precisely determined to 30°.

The number of additional image points can be arbitrarily increased to increase accuracy. The distance at which the additional image points are predetermined to be from the first image point can also be predetermined as a function of data on the predetermined pattern in order to consider any scale deviations with respect to distance between pattern image points and the first and additional image points in the search image.

According to an advantageous modification of the invention, a data vector is determined as a function of the image point data of image points of a test environment that encloses the image point largely as a square or circle. More than one test environment, for example, as described above, a smaller first test environment with about 25 image points and a larger second test environment of, say, about 225 image points, can then also be used. A test environment is formed, for example, by the image points within a square or circle enclosing the image point.

According to a preferred variant of the method according to the invention a reference data vector is determined from an image data set of a predetermined object recorded by the device and/or from an image data set that was generated from a model of the predetermined object.

The predetermined pattern then corresponds to a predetermined object. The method could then be applied to any predetermined objects. In military applications this predetermined object, for example, can be a specific vehicle, like a tank. The object is then recorded with a multispectral camera so that an image data set of the object is available. If the object is not accessible, a data set can also be generated from a model of the object.

According to a modification of the method according to the invention a background reference image is also recorded and the data vectors of the image points are processed as a function of the image data points and background reference image.

The background reference image is a recording of the background, in front of which the predetermined pattern is then sought. The background, however, is preferably recorded in the background reference image with the predetermined pattern and then serves to position recorded image point data with reference to image point data of the background.

If, for example, a vehicle is to be sought in the desert, using the method according to the invention, the desert is recorded as background reference image. If the same vehicle is sought, for example, on a grassy landscape, the grassy landscape is recorded as background reference image. The background reference image yields background image point data, like characteristic color values, for example, red values, green values, which can be used to reduce interfering variables in a recorded search image. Such interfering variables can be due to the fact that a vehicle in the desert during the day emits, in principle, higher red values than at night and because of this has a different color than in a neutral background, as is used to record the reference images. By means of appropriate background reference images that were recorded at different times of day and under different weather situations, interfering variables dependent on the time of day and weather can also be reduced. Image point data and/or data vectors of recorded images points can therefore be normalized with consideration of background reference images so that at all times of day and weather situations similar, normalized color values and luminance values of the searched object can be expected.

Preferably an affine transformation on recorded unnormalized color component values of the image point data is used to normalize a brightness value and/or color contrast value. The predetermined parameters or those to be used in the affine transformation are determined from the image point data of the background reference image or are entered in a simulation computer program as model. After affine transformation, linear filtering with a color component value or brightness value weighted and averaged according to the invention can be applied to the recorded color components of the image point data. This filtering can include differentiation and edge amplification in the surface and smoothing in detail.

An affine transformation is also preferably applied to recorded image data point or recorded color vector data of all image points of a search image for expansion of at least one normalized color component of the image data and/or for compression of at least one color component in order to deliberately increase and therefore optimize the color contrast of the searched objects in the search image.

In this way the sensitivity to smaller differences between image point data and reference data in the frequency range that is expanded is increased and it is reduced in the area that is compressed. The frequency area that is expanded is then positioned at particularly informative frequencies. Other frequency areas that are less informative, on the other hand, are compressed. Expansion is then understood to mean a linear or nonlinear change in color or brightness scale. The expanded areas are then shown exaggerated and therefore more precisely and the compressed areas are shown less precisely.

In a military application of the method a frequency area that is to be expanded lies, for example, in the area of color values of camouflage colors, i.e., in certain green values and brown or red values and the colors with which military vehicles are typically camouflaged. In this way it can be distinguished more precisely, for example, whether a recorded green value actually corresponds to a camouflage color of the predetermined object or a green value typically occurring in the background, for example, in vegetation. In this way the contrast between a searched object and a background is increased.

Moreover, as described above, linear filtering through a modified Sobel filter is generally applied to the entire search image, which causes differentiation in edge emphasis to be large and smoothing of contrast and color trends to be small on recorded image point data. For this purpose a coefficient matrix according to the invention is used and applied to a formed data vector.

If color values are recorded as image point data in this way, the transitions in color transition zones become steeper and narrower so that pure color values with better contrast relative to adjacent areas with other color values result.

According to a preferred variant of the method according to the invention, data vectors with at least 16 characteristic coefficient values are determined for one image point.

The 16 characteristic coefficient values include average values of the recorded red values $<R>_1$, recorded green values $<G>_1$, recorded infrared value $<I>_1$ and average values that calculate luminances $<E>_1$ of image points within the first test environment, standard deviations of the mentioned quantities within the first test environment, $\sigma_R, \sigma_G, \sigma_I, \sigma_E$, average values of the same quantities within the second test environment, $<R>_1, <G>_1, <I>_1, <E>_1$ and curvature values from the difference of the average values $k_R=<R>_1-<R>_2, k_G=<G>_1-<G>_2, k_I=<I>_1-<I>_2, k_E=<E>_1-<E>_2$ determined from the difference of the average values in the two test environments.

At least 32 characteristic coefficient values are preferably used to recognize a predetermined pattern in relation to 32 characteristic reference coefficient values, namely 16 coefficients of the first data vector and 16 coefficients of the second data vector. Additional characteristic coefficients with which correlations can be checked between the pattern and image points of the recorded image data set are determined, for example, by forming a difference between components of the first and second and, if required, between components of additional data vectors. Four additional values can be added to the 32 characteristic coefficient values, which are determined by difference formation between the color values and luminance values of the first and second data vector.

According to another preferred variant of the method according to the invention, nine 5×5 pixel elements are used for a test environment with 15×15 pixels. For this purpose data vectors with 9×4 color components and brightness values, i.e., 36 characteristic coefficient values are determined, if only the average values are used. If the standard deviations are also used, the coefficient set of the feature vector of a test environment includes 72 coefficients.

According to another preferred variant of the method according to the invention a test environment with 25×25 pixels from nine 5×5 pixel elements and four 15×15 pixel ring elements arranged on the corners of the test environment is used. For this purpose data vectors with 13×4 color component and brightness values, i.e., 52 characteristic coefficient values are determined, if only the average values are used. If the standard deviations are also used, the coefficient set of the feature vector of this test environment includes 104 coefficients.

For image evaluation with these two test environments it is sufficient to test 12 uniformly distributed rotational positions of the target object in order to achieve full recognition of separation sharpness of the image recognition algorithm.

The eight characteristic coefficient values of an image point are average values and standard deviations of recorded red values $<R>_1$, recorded green values $<G>_1$, recorded infrared value $<I>_1$ and recorded luminances $<E>_1$ of image points in a test environment and the standard deviations of the mentioned quantities within the first image point of the first test environment, $\sigma_R$, $\sigma_G$, $\sigma_I$, $\sigma_E$.

BRIEF DESCRIPTION OF THE DRAWINGS

The invention is further explained below with reference to the appended drawings as an example. In the drawings.

DETAILED DESCRIPTION

Figure 1:
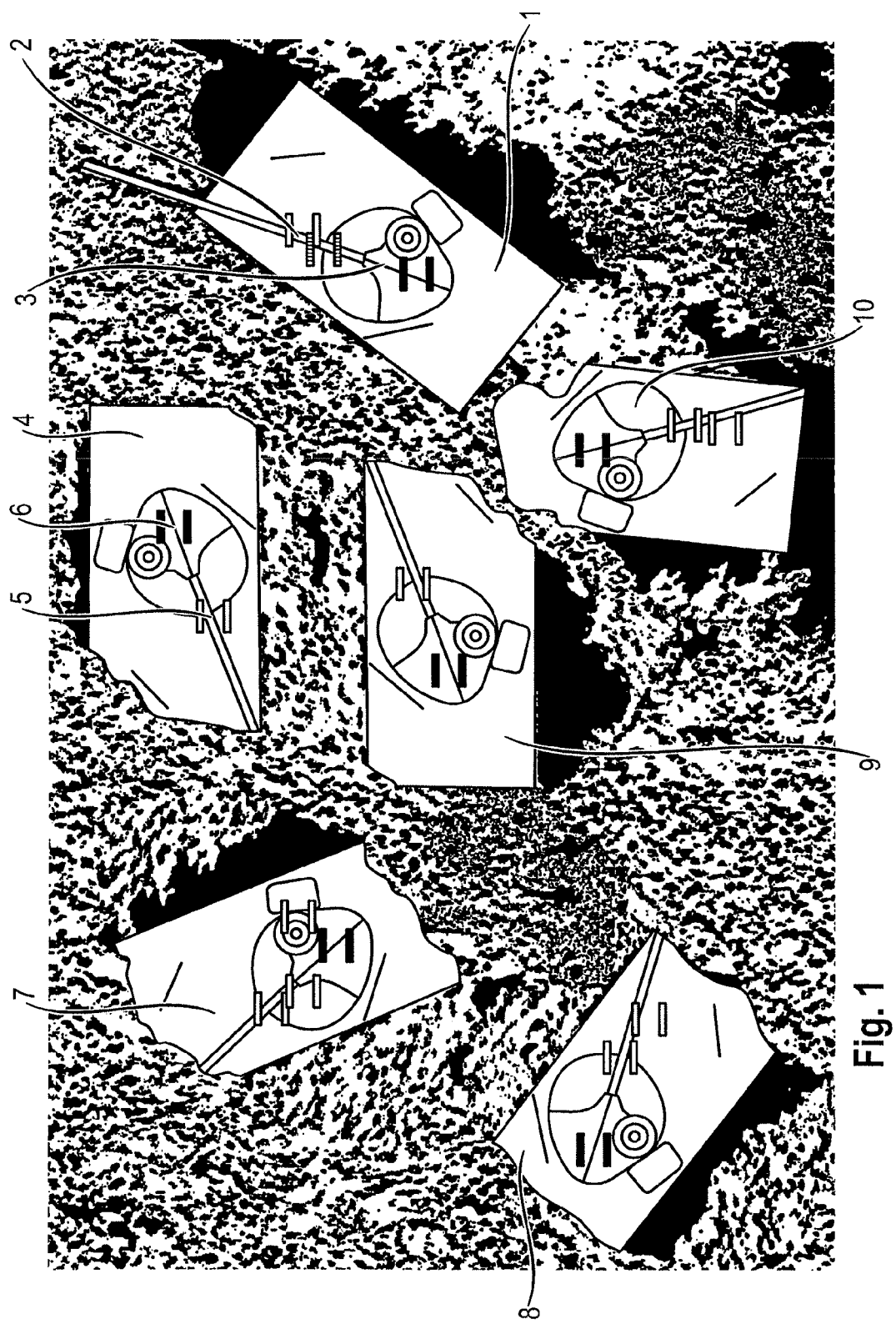
FIG. 1 shows a view of a pattern recognized with the method according to the invention in six different rotational positions.

FIG. 1 shows a pattern in six different rotational positions recognized by means of a method according to the invention. The depicted practical example of the predetermined pattern then corresponds to a recording of a tank in six different rotational positions recorded with a multispectral camera.

The photos of the tank were made during an overflight of terrain in which the mentioned multispectral camera was positioned on board an aircraft and had four spectral channels. It is designed to record red color values, green color values, near infrared and far infrared. Before the photo was made, two reference data vectors for two selected pattern image points of an image pattern recorded with the same camera were formed for the depicted tank. The two selected pattern image points in the depicted variant lie on the turret of the tank and on a gun barrel emerging from the turret.

The tank depicted in FIG. 1 was recognized by first recording an image point that corresponds to the first pattern image point, in the present case the one on the gun barrel. A search for additional image points was then made in a circular area around the first image point and it was determined whether one of the additional image points corresponded to the second pattern image point and if which one corresponded to the second pattern image point, i.e., the one on the turret.

The first image point in FIG. 1 lies between two bars marked white and the second image point lies between two bars marked dark. The first image point 2 on the top right in FIG. 1 is shown in a first tank 1 and a second image point 3 was found to the left and beneath the first image point 2. From the relative position of the two image points 2, 3 the position, on the one hand, and the rotational position, on the other, of the tank 1 were determined. It is oriented with its gun barrel at roughly a 20° angle to the right at the top in the plane of the figure.

In a second tank 4 a first image point 5 pertaining to a pattern belonging to the tank was found and a second image point 6 identified in which the second image point 6 was found in this tank 4 to the right above the first image point 5. The position and rotational position of the gun barrel of the tank 4 was again determined from the determined image points 5, 6.

The other tanks 7, 8, 9, 10 were also recognized by means of a method according to the invention. The aforementioned image points were then recognized in which additional image points were also recognized as additional information in tanks 7, 8 and 10, which permitted more precise position and rotational position determination.

Figure 2:
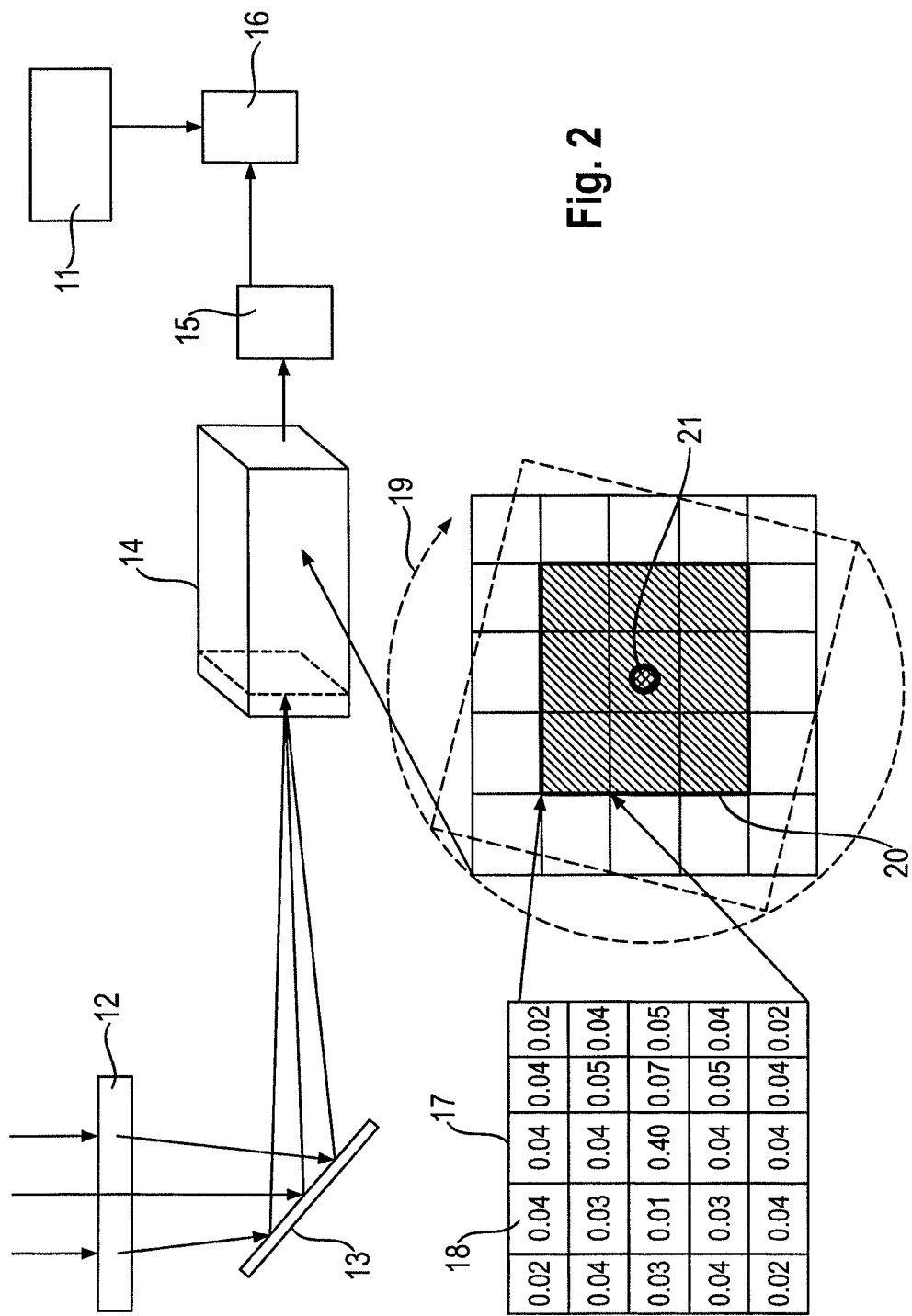
FIG. 2 shows a graphic schematic depiction to explain the method.

The following presentation serves for further explanation of the method according to the invention in conjunction with FIG. 2 of the drawing.

Of all the target objects that are to be searched, images of characteristic detail are placed in a target image reference database 11 and stored with the necessary position data on the target object and in the detail reference image. For this purpose data are stored where the target occurred. If no direct images of the target are available, these can be generated with sufficient information about the target object by a computer graphics system.

Image points recorded by an NIR camera 14 with color filter wheel were recorded via telescope optics 12 and a scanning mirror 13 and processed by an image processing computer 15 with coefficient filters for the elements being recorded. By means of a schematically depicted device 16 multispectral image recognition prescribed according to the invention was conducted. Device 16 can be an appropriately programmed image recognition processor or computer. The pixel resolution of the search image must be converted so that sufficiently many well recognizable characteristic and its possible unconfusable details of the search object can be imaged on an image search of 15×15 pixel. The feature vector of the detail is formed from the characteristic data of small image surfaces each with 5×5 pixel size. In the simplest case the average values of the color components and the total brightness of the 25 pixels serve as characteristic data. According to the invention, with better recognition performance the average values of the total brightness and weighted average values of the normalized brightness of the individual color components of the image surfaces weighted with the filter matrix 17 are used as feature vector.

The coefficients 18 in the filter matrix 17 are chosen so that a differentiating and a smoothing effect occurs. The image appears richer in contrast and sharper in the edges on this account. The coefficients 18 of the filter matrix 17 of the individual 5×5 pixel image surface are then chosen (i.e., their weighted average values) so that the feature vector is rotationally invariant, i.e., the same in each rotational position.

This gives the calculation advantage that the feature vector of the individual image pixels need only be calculated once beforehand with averaging and filtering. By simple coordinate transformation of the image point the 12 feature vectors used for the tests of the 12 rotational positions of the test environment can be calculated. The test environment 20 in the variant depicted in FIG. 2 has nine elements and has a center pixel 21. For calculation of a larger detail with 15 pixel diameter this is composed of nine of the 5×5 pixel surfaces. The pixel surfaces on the diagonals are arranged in a square arrangement, which must be transformed for the tests into the 12 rotational positions.

The overall detail is therefore formed according to the invention from a special arrangement of eight 5×5 pixel elements each arranged around a center element with center pixel 21 (in the context of pixel resolution). For calculation of the feature vector of the overall detail for each rotational position being tested of the target the center points of the 5×5 pixel elements are transformed into the searched rotational position. For each center point the weighted center point value for all colors and the brightness is then read out from the overall image database and combined to the feature vector of the overall detail and the tested rotational position. Experiments have shown that 12 tested rotational positions are sufficient for pattern recognition with full performance.

For characterization of a target that is situated in front of an environment whose pattern is very similar to the target, i.e., a camouflaged vehicle in front of a vegetation background, at least two test environments are now searched, which show, if possible, details that cannot be confused with the background and using images in the highest possible resolution in which the spot patterns are fully resolved. In these types of images good results are already achieved with the average values for the feature vectors.

In the search for very complex objects that stand out well from the background, the search can be strongly accelerated by starting the search in a search image depicted with a strongly coarsened resolution of, say, 6 meters in a 150 meter object, which is chosen so that the searched object is recorded precisely in a 25×25 pixel test environment. The size of the test environment must therefore be adapted to each target in order to achieve the most effective possible search process. In addition, average values of standard deviation for forming the feature vectors must always be used in this case in order to optimize the separation sharpness.

As soon as a search object is recognized, a second set of test environments at higher resolution of, say, 1 meter resolution, which, for example, records a ship in six adjacent test environments, is tested against the reference database and recognition of the object refined. Here again average values and standard deviation are used.

If precise assignment of the found objects to the reference database is still not possible, individual objects on the deck of a ship object are used from the reference database with the full resolution of the camera of, say, 0.2 meters in order to contribute to a more precise clarification of the identity of the considered ship object with reference to the reference database. The average values are sufficient for formation of the feature vectors for the search for details.

In addition, objects, for example, weapons, which are discovered on the deck of a ship normally known to be legal, can also give indications that a crime is present here. For precise recognition of weapons and similar hazardous objects images with very high resolution of 2.5 cm can be made with the camera and compared with the reference photos. Photos of this type can be used in court as evidence.

Reference numbers in the claims, description and drawings merely serve for better understanding of the invention and do not restrict the scope of protection. The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 First tank
2 First image point of first tank
3 Second image point of first tank
4 Second tank
5 First image point of second tank
6 Second image point of third tank
7 Third tank
8 Fourth tank
9 Fifth tank
10 Sixth tank
11 Reference target image database
12 Telescope optics
13 Scanning mirror
14 NIR camera with color filter wheel
15 Image processing computer
16 Device
17 Coefficient matrix
18 Coefficient, weighting factor of a pixel
19 Rotational position
20 Test environment
21 Center pixel of the test environment

What is claimed is:

1. A method for recognizing a predetermined pattern in an image data set having a number of recorded image point data, the image data set being recorded by a device for recording at least two electromagnetic frequency spectra, the method comprising the steps of:
   forming, by an image processor, first and second reference data vectors each having characteristic reference coefficient values for at least one of at least two pattern image points of the predetermined pattern;
   forming, by the image processor, a data vector having characteristic coefficient values as component for each image point of at least a selected area of the recorded image points, from the image point data of a corresponding image point and from image point data from at least one test environment of the image point, the at least one test environment consisting of image points at a predetermined distance to the corresponding image point;
   forming, by the image processor, at least a first difference value for the image points of the selected area as a function of a difference between the data vector of the corresponding image point and the first reference data vector;
   forming, by the image processor, at least a second difference value for at least one image point of the selected area as a function of a difference between the data vector of the at least one image point of the selected area image point and the second reference data vector;
   determining, by an image recognition processor, whether at least one pattern correlation quantity determined as a function of the first and second difference values is below a predetermined threshold value and whether the at least one pattern correlation quantity forms a local minimum in an environment of a size of a target object;

recognizing, by the image recognition processor, the predetermined pattern when the at least one pattern correlation quantity is below the predetermined threshold value and the local minimum is present.

2. The method according to claim 1, wherein at least a characteristic coefficient value of a data vector is determined as average value from the image point data in a frequency range of visible light, in an infrared range, or as average value of luminances of the image points of a first test environment of the at least one test environment.

3. The method according to claim 1, wherein at least a characteristic coefficient value of data vector is determined as a standard deviation between image point data, which were recorded for image points lying within the first test environment, or is determined as a standard deviation between luminances of the image points of a first test environment of the at least one test environment.

4. The method according to claim 1, wherein at least one characteristic coefficient value of data vector is determined as an average value of image point data of the image points of a second test environment or as average value of the luminances of the image points of a second test environment of the at least one test environment.

5. The method according to claim 1, wherein at least one characteristic coefficient value of the data vector is determined as a difference between an average value of the image point data or luminances of a first test environment of the at least one test environment and an average value of the image point data or luminances of a second test environment of the at least one test environment.

6. The method according to claim 1, wherein image points in which an absolute amount of the first and second difference values of the first and second vectors fall below a predetermined first threshold value and an absolute amount of the first and second difference values of the first and second vectors of the test environment in all directions forms a local minimum in an area that covers the size of the searched target object are chosen as preselection from the recorded image points.

7. The method according to claim 1, wherein a preselection of image points is formed by selecting image points in which one or more difference values are minimal.

8. The method according to claim 1, wherein the first and second reference data vectors are formed from pattern image point data of a reference test environment, for the image points of the selected area or the preselection as a function of the differences between the recorded image point data and the pattern image point data a histogram is prepared from the reference test environment and a selection of image points is formed as a function of an evaluation of the histogram.

9. The method according to claim 6, wherein at a predetermined difference from an image point of the preselection or selection largely circularly arranged, additional image points are chosen and an additional image point, whose second difference value is minimal and falls below a predetermined second threshold value, is determined as the second image point of the pattern.

10. The method according to claim 1, wherein a data vector is determined as a function of the image point data of image points of a test environment that encloses the image point as a square.

11. The method according to claim 1, wherein a reference data vector is determined from an image data set of a predetermined object recorded by the device or from an image data set that was generated from a model of the predetermined object.

12. The method according to claim 1, wherein a background reference image is recorded and the data vectors are processed as a function of image point data of the background reference image.

13. The method according to claim 1, wherein a brightness value or a color contrast value is normalized by applying an affine transformation to the recorded image point data.

14. The method according to claim 1, wherein an affine transformation is supplied to the recorded image point data for expansion of at least one frequency range of the image data or for compression of at least one frequency range.

15. The method according to claim 1, further comprising:
applying linear filtering with a two-dimensional digital filter, differentiation, edge recognition, or smoothing to the recorded image point data.

16. The method according claim 1, wherein data vectors with at least 36 characteristic coefficient values are determined.

17. The method according to claim 1, wherein a larger test environment is formed from smaller rotationally invariant circular and annular elements and that rotated positions of the test environment are determined from stored coefficient values of the elements calculated beforehand by simple coordinate rotation and summing of the precalculated coefficients of the elements with reduced calculation expense.

18. The method according to claim 1, wherein each arbitrary rotational position of the target object is recorded and correlated using a 15×15 pixel test environment from 3×3 circular elements and a larger 25×25 test environment from 3×3 circular elements and four annular elements arranged on the four corners with 15 pixel diameter by calculation of testing of 12 rotational positions.

19. The method according to claim 1, wherein an average of color and luminance values weighted with the coefficient matrix is used as feature vector for each 5×5 pixel element and the feature vector is rotationally invariant through the form of the coefficient matrix.

20. The method according to claim 1, wherein the target object during training is stored in only a single rotational position in sufficient resolution and during training of the image recognition system the feature vector of the test environment in the size of the target object is calculated beforehand in a small number of rotational positions of the target object during training, for which separate images of the target object are required in all rotational positions that must be stored in the reference target image database, but the feature vectors for the required rotational positions of the target object are determined during the evaluation with reduced calculation expense.

* * * * *